Apr. 10, 1923.
A. R. DRESSLER
1,451,329
AIR FILTER FOR ENGINES
Filed May 8, 1922
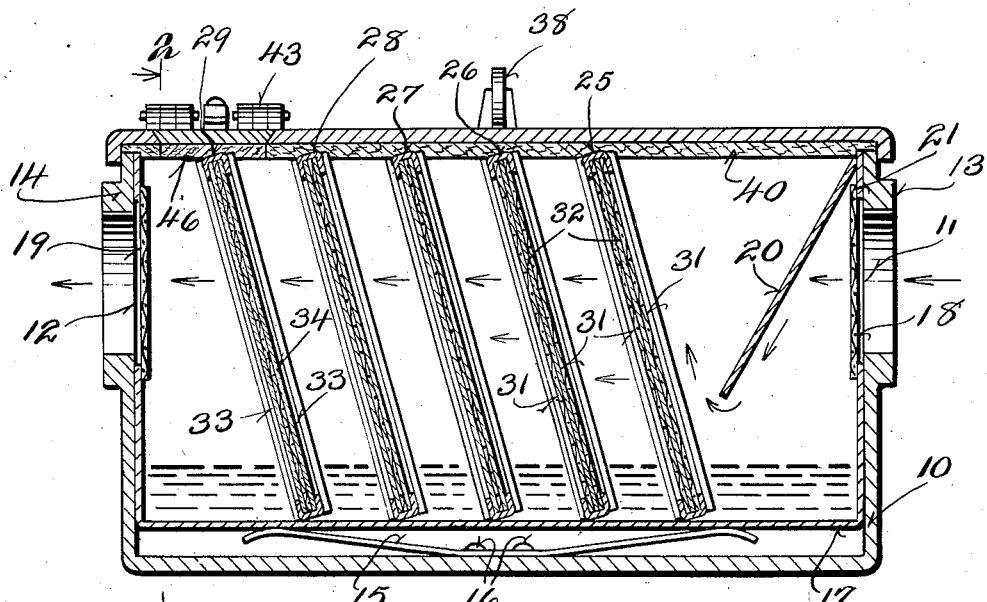
Fig. 1.
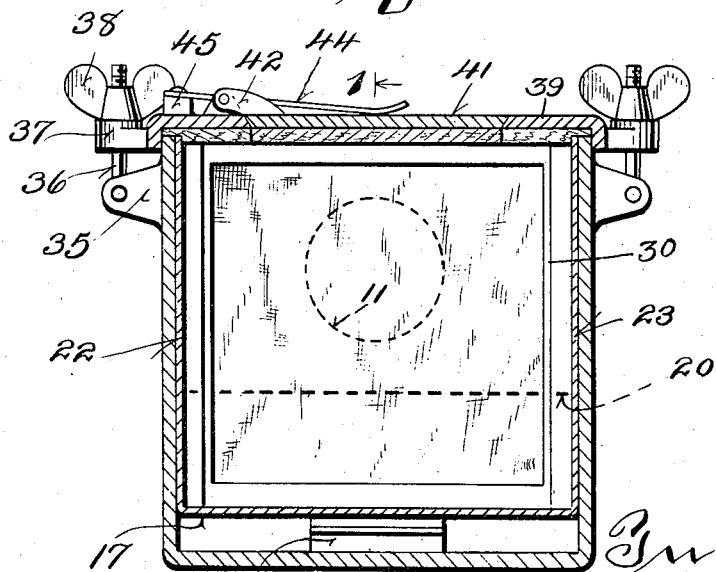
Fig. 2.
Fig. 3.
Inventor
Alvin R. Dressler Patented Apr. 10, 1923.

1,451,329

UNITED STATES PATENT OFFICE.

ALVIN R. DRESSLER, OF SHEBOYGAN, WISCONSIN.

AIR FILTER FOR ENGINES.

Application filed May 8, 1922. Serial No. 559,437.

*To all whom it may concern:*

Be it known that I, ALVIN R. DRESSLER, a citizen of the United States, and resident of Sheboygan, in the county of Sheboygan and State of Wisconsin, have invented certain new and useful Improvements in Air Filters for Engines; and I do hereby declare that the following is a full, clear, and exact description thereof.

The invention relates to an air filter cleaner or washer particularly adapted for use in connection with automobile tractors and motor-driven trucks and the like and gas and oil burning engines for filtering, cleaning or washing the air.

The invention comprises a casing having inlet and outlet openings, a container adapted to be positioned in the casing, a plurality of filters adapted to have their lower ends submerged in oil in the lower part of the container, a baffle in the container, a lid for the casing, and resilient means tending to press the container upwardly, thus bringing the filters in contact with a fibre pad lining the lower surface of the lid. Air entering the inlet orifice strikes the baffle and assists in conveying oil to parts of the filters which, in contact with the fibre lining of the cover, make a complete closure, the air being fed through the filters which are soaked with oil.

A primary object of the invention is the provision of a structure, the parts of which are readily assembled and disassembled, which are conveniently accessible for inspection and yet which render it impossible that incoming air should go through without having been subjected to filtering action. That is, there is no leakage nor escape of air around or about the filters, but all of the air goes through them. When the lid is removed, the filters are exposed for examination, yet when it is clamped in place, the fibre lining contacts with the tops of the filters making a complete closure. A spring is provided for urging the container upwardly so that the tops of the filters are embedded in the soft pad.

An important object of the invention is the thoroughness of the filtering action, as the access of even minute quantities of grit or dust to engine parts results in considerable damage. This function is extremely important. Accordingly, therefore, a plurality of filters are used and the arrangement is such that the air, cooperating with the capillary action of the fabric sheets in the filters, spreads a supply of oil over the filters, the air passing therethrough being consequently subjected to the thorough filtering action of the moistened cloth. In this way the air finally fed through the device is rendered almost perfectly clean.

With the above and other objects in view, which will appear as the description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:

Figure 1 is a vertical central section through the invention on the line 1—1 of Figure 2.

Figure 2 is a transverse section on the line 2—2 of Figure 1.

Figure 3 is a detail cooperating and guide filtering frame.

Casing 10 is provided with an inlet opening 11 and an outlet opening 12, the openings being directed through bosses 13 and 14. On the bottom of the casing, spring 15 having upwardly directed arms is secured by means of retainers 16, the arms bearing against the bottom of containers 17 provided with wire fabric discs 18 and 19 at the inlet and outlet openings. The container is open at the top and near the inlet opening 11 is provided with a baffle 20 secured to end wall 21 at the top thereof and side walls 22 and 23 so that air entering the inlet opening 11 travels through wire fabric disc 18 and is directed downwardly by baffle 20 against the surface of a quantity of oil in the bottom of the container. A plurality of guides 24 U-shaped in cross section are provided for the reception of filter frames 25, 26, 27, 28, and 29, whose flanges 30 are laterally directed, the flanges of frames 25 and 26 exerting a gripping action on screens 31 between which is a fabric sheet 32. Frames 27, 28, and 29 by their flanges 30 grip fabric sheets 33 between which is a screen 34. Thus the frames and the screens cooperate to give a desired rigidity to the filters. Guides 24 are of such nature to permit free sliding movement of frames 25 therein, yet fit sufficiently close to make a proper and effective seal.

Casing 10 is provided with a pair of laterally directed lugs 35 to which links 36 are pivoted capable of extending through eyes 37 and thus secure by means of thumb nuts 38 lid 39 tightly to the casing 10. The lower surface of lid 39 is provided with a suitable felt, or other fabric lining 40. When the filters are in position and the lid is moved downwardly, the lining 40 contacts with the filter frames, which become embedded therein, making a complete seal, the air entering inlet opening 11 and being downwardly directed by baffle 20, lifts oil and cooperates with the capillary action of the fibre sheets to spread the liquid over the entire surface of the filters.

Thus the air is subjected to a thorough filtering action. There is no escapage about the margins of the filters and the effect of the oil on the fabric sheets is such as to produce a thorough cleansing effect.

The lid is provided with a valve 41 having a plurality of ears 42 thereon pivoted to lugs 43. A spring 44 is secured to rest 45 and exerts a depressing action on valve 41, bringing its bevelled edges in contact with the contiguous edge of the lid. Valve 41 is provided with a suitable lining 46, which contacts with the filter frame 29. In the case of back fire, where excessive pressure is developed, valve 41 lifts against the force of spring 44 and releases the compressed gases. Thus, there is no danger of a damaging action on any parts of the filter.

It will be noted that the filters are inclined somewhat, since the air travels upwardly, as indicated by the arrows along the face of the first filter, the inclination thereof facilitating the action of the air in carrying oil to the various parts of the filter.

I claim:—

1. In a filter for engines the combination of a casing, a quantity of oil in the bottom thereof, a plurality of filters having their lower ends extending into said oil, a lid for said casing, and a fabric lining for said lid cooperating with said filters to prevent the escape of air about said filters.

2. In a filter for engines, the combination of a casing, a container therein, resilient means for moving said container upwardly in said casing, a plurality of filters in said container, a quantity of oil in the bottom of said container, said filters having their having their lower edges submerged in said oil, a lid for said casing, and a fibre lining for said lid, said lining cooperating with said filters for making a complete closure to prevent the escape of air about said filters.

3. In a filter for engines, the combination of a casing, a container therein, resilient means for moving said container upwardly with respect to said casing, a plurality of filters in said container, a quantity of oil in the bottom thereof covering the lower edges of said filters, a lid for the casing, a fibre lining for said lid, and a valve in said lid operative to release fluid from said container when said fluid is subjected to excessive pressure.

In testimony that I claim the foregoing I have hereunto set my hand at Sheboygan, in the county of Sheboygan and State of Wisconsin.

ALVIN R. DRESSLER.